Oct. 22, 1963  T. A. MATTHEWS II  3,108,060
LOOP REACTOR AND PROCESS FOR SULFONATING ASPHALT
Filed May 10, 1960
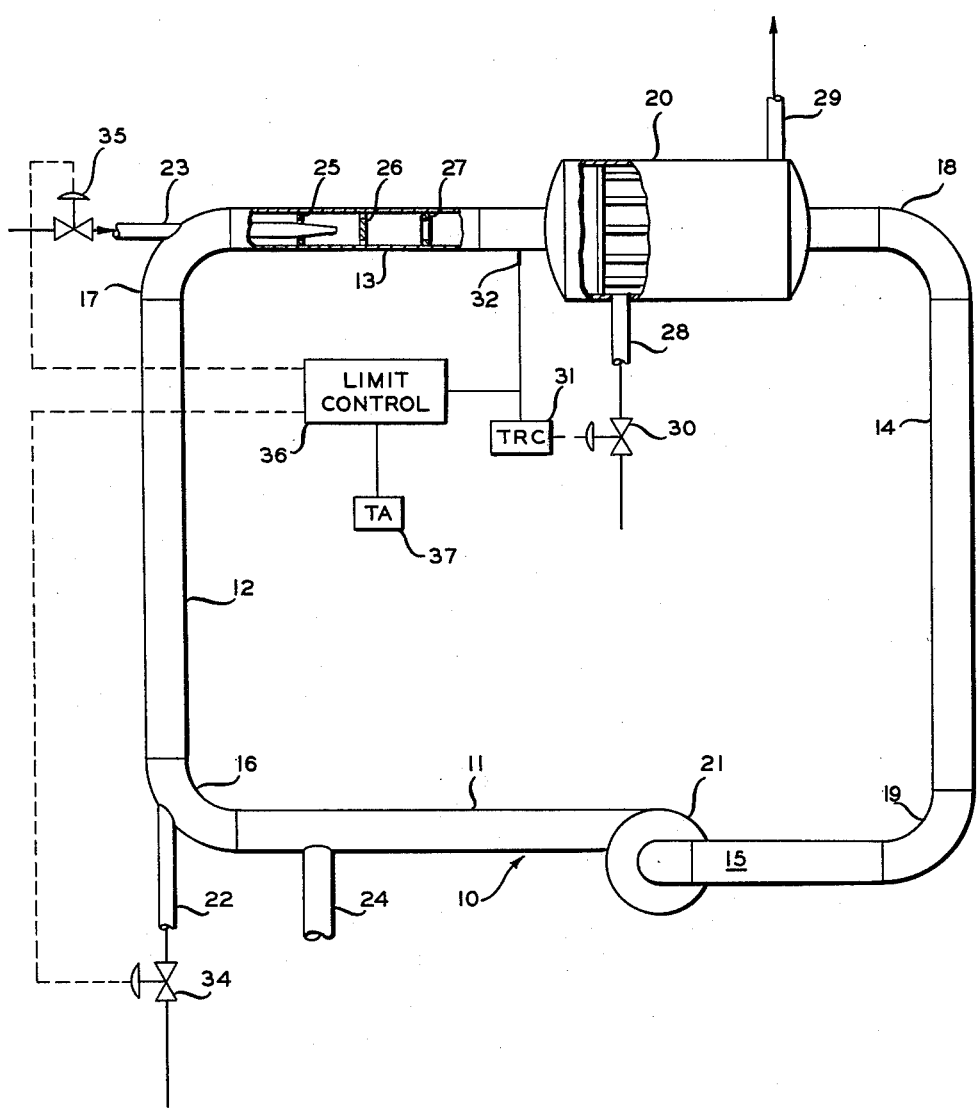
INVENTOR.
T. A. MATTHEWS II
BY Hudson & Young
ATTORNEYS

United States Patent Office 3,108,060
Patented Oct. 22, 1963

3,108,060
**LOOP REACTOR AND PROCESS FOR
SULFONATING ASPHALT**
Thomas A. Matthews II, Bartlesville, Okla., assignor to
Phillips Petroleum Company, a corporation of Delaware
Filed May 10, 1960, Ser. No. 28,135
2 Claims. (Cl. 208—44)

This invention relates to a loop-type continuous reactor. In one aspect, the invention relates to a loop reactor which is provided with turbulence inducing means. In another aspect, this invention relates to a loop reactor which is provided with a combination of improved turbulence inducing means and reactant inlet which produce superior mixing. In another aspect, this invention relates to a loop-type reactor which finds utility in connection with a process for sulfonating asphaltic materials. In another aspect, this invention relates to a process for sulfonating asphaltic materials.

Many useful products have been produced by a process of sulfonating organic compounds. Such products have been formed from petroleum hydrocarbons by a process of sulfonation, using such sulfonating agents as sulfuric acid, oleum and chlorosulfonic acid. Recently, it has been found that products useful, for example, as oil well fracturing fluids or drilling mud fluid loss control additives, can be formed by sulfonating asphaltic materials with sulfur trioxide. Problems have arisen in the sulfonation of such asphaltic materials through the necessity for (1) removal of heat from the reaction zone, (2) rapid and complete dispersion of the highly reactive additive to avoid local overtreating, (3) prevention of settling of solid particles and (4) the elimination of low fluid velocity areas within the reaction zone in which a gel might form.

It is an object of this invention to provide an improved reactor for producing sulfonated asphaltic material. Another object is to provide a reactor which combines desirable features for an asphalt sulfonation process in a single apparatus. Another object is to provide rapid, complete dispersion of one reactant within another and to prevent settling of solid particles. Another object is to eliminate low fluid velocity areas in a sulfonation reactor. Another object is to provide an improved process for sulfonating asphaltic materials.

Other aspects, objects and advantages are apparent from a study of this disclosure, the drawing and the appended claims.

According to this invention, there is provided a reactor comprising a conduit loop provided with inlet and outlet means, circulation means, agitation means and heat exchange means. Also, according to this invention, there is provided an improved reactor comprising turbulence inducing means, and a reactant inlet in the area of turbulence produced by said means. Also, according to this invention, the turbulence inducing means comprises a first orifice, a centrally located baffle downstream of said first orifice and a second orifice downstream of said baffle. Further, according to this invention, there is provided an improved combination of reactant inlet and turbulence inducing means wherein a reactant inlet nozzle is adapted to discharge between a first orifice and a baffle downstream of said orifice and to impinge a stream of reactant on said baffle.

Further, according to this invention, there is provided and improved process for sulfonating asphaltic material comprising moving said material in a continuous closed path reaction zone, contacting said material with a sulfonating agent in a zone of turbulence in said reaction zone, extracting heat from said reaction zone, maintaining continuous circulation in said reaction zone and withdrawing continuously from said reaction zone a sulfonated product. Further, according to this invention, there is provided an improved process for contacting a first fluid with a second fluid which comprises creating a first zone of turbulence in said first fluid, injecting said second fluid into said first zone and creating a zone of impingement in said first zone and passing the resultant mixture through a second zone of turbulence adjacent said first zone.

The term "asphaltic material" as used in this specification and claims is meant to cover dark brown to black liquid, semi-solid or solid cementitious mixtures of hydrocarbons in which material bitumens are the sole or predominant constitutent. These materials include naturally occurring or native asphalts, such as albertite, elaterite, gilsonite, grahamite, wurtzilite, and the like, as well as such materials produced from petroleum hydrocarbons by distillation, precipitation, cracking, oxidation, or similar operations, for example, distillation residues, still bottoms, cracked residues, straight-run residues, asphaltic bitumens, blown asphalt, and the like. The invention is particularly applicable to the process of sulfonating such materials with liquid sulfur trioxide.

In the drawing, loop reactor 10 comprises pipes 11, 12, 13, 14 and 15, long radius L's 16, 17, 18 and 19, heat exchanger 20 and pump 21. Inlet 22 is provided for the asphaltic material and inlet 23 for the sulfonation agent. Outlet 24 is provided for withdrawal of the sulfonated product.

Inlet 23 extends through L 17 into the interior of pipe 13, as shown, and terminates between an annular baffle 25 and a central baffle 26. An additional annular baffle 27 is also shown. Coolant liquid inlet 28 and outlet 29 are provided on heat exchanger 20. Inlet 28 is provided with a control valve 30 which is operated by temperature recorder controller 31 in accordance with the temperature in the reaction mixture stream. As shown in the drawing, the temperature is measured by sensing element 32 near the reaction mixture inlet to heat exchanger 20. When the temperature exceeds a predetermined limit, thermocouple 32 will generate a signal indicative of the temperature sensed and actuate the limit controller 36 which operates to shut valves 34 and 35 and actuate the temperature alarm 37.

The limit controller 36 forms no part of this invention as such. One such limit controller is the Series 2300-AH, automatic control, fixed single contact, high limit, manufactured by Assembly Products Incorporated. If desired, a separate temperature controller (not shown) can be used to actuate valves 34 and 35.

Although inlets 22 and 23 are shown as separate connections, it is within the scope of the present invention to provide loop reactor 10 with a single inlet and combine the asphaltic material with a sulfonating agent prior to entry into reactor 10. The combination of baffles 25, 26 and 27 in pipe 13, in combination with sulfonating agent inlet 23, as illustrated, is a preferred structure. However, other modifications may be used within the scope of this invention. For example, variations in the size and number of the turbulence inducing and the impingement inducing means may be made to provide a first zone of turbulence, a zone of impingement within this first zone, and a second zone of turbulence adjacent the first zone. Pump 21 is illustrated as being a centrifugal pump which can, for example, be driven by an electric motor (not shown) but other types of means to circulate material in loop 10 may be used, such as a positive displacement pump.

In one embodiment, the pipes 11, 12, 13, 14 and 15 are all made of 6 inch schedule 80 pipe, and wide sweep L's connect the various sections. Inlet 23 comprises a ½ inch schedule 80 pipe and terminates in a ¼ inch nozzle. Outlet 24 is a 1½ inch schedule 80 pipe. Baffle 25 is a plate having a 4½ inch orifice, baffle 26 is a 2⅞ inch plate supported by a suitable spider, and baffle 27 is a plate having a 2⅞ inch orifice. Heat exchanger 20 provides 3,460 square feet of heating surface. As illustrated in the drawing, all of the orifices and baffle plates are centrally located.

In carrying out a sulfonation process according to the present invention with the apparatus illustrated in the drawing, 18 g.p.m. normal hexane with 6 g.p.m. pitch, resulting from a vacuum distillation operation, dispersed therein, at a pressure of 131 p.s.i.a. and 80° F. are fed through inlet 22. Two g.p.m. of a stabilized sulfur trioxide liquid plus 6 g.p.m. of normal heptance, the stream at a pressure of 175 p.s.i.a. and 80° F., are fed through inlet 23. The combined stream at the end of pipe 13, entering heat exchanger 20, is at 79 p.s.i.a. and 90° F. 332 g.p.m. chilled water at 68° F. flow to coolant liquid inlet 28 and leave at outlet 29 at a temperature of 78° F. resulting in a cooling of the reaction mixture flowing through heat exchanger 20, which mixture leaves at the inlet of L 18 at 69 p.s.i.a. and 80° F. At the end of the pump 21, the stream is at 57 p.s.i.a. and 80° F. and leaves at 144 p.s.i.a. and 80° F. Sulfonated product is removed at outlet 24.

The rate of flow in reactor 10 is 9 to 11 feet per second, thus preventing the settling of solid particles and the elimination of low fluid velocity areas in which a gel might form. The sulfonating agent entering through inlet 23 impinges on baffle 26 and the stream is stirred violently as it passes through baffles 25 and 27 and around baffle 26, thus resulting in rapid and thorough dispersion of the highly reactive sulfonating agent to avoid local overtreatment within the stream. Heat exchanger 20, provided for removal of heat from the reaction zone, is also sized to maintain the reaction mixture flow rate of 9 to 11 feet per second to prevent solids settling and/or gel formation. Pump 21 circulates 871 g.p.m., resulting in an amount of recycle to provide sufficient thermal inertia to prevent an unsafe temperature rise at inlet 23. This recycle plus the efficient dispersion obtained through the high linear rate of flow of the sulfonating agent, approximately 30 to 40 feet per second, and the maintenance of highly turbulent conditions at this point all combine to pervent undesirable temperature rise.

Other items of equipment which are used in a complete sulfonation plant, but which form no part of the present invention, are not shown in the drawing to prevent unnecessary complication. These include, for example, asphalt tanks, pumps, colloid mills, coolers on the material inlet line leading to inlet 22, sulfur trioxide storage tanks, run tanks and metering pumps supplying inlet 23, neutralizing tanks, driers, conveyors, etc. on the sulfonated product outlet.

Thus, it is seen that there is provided a relatively simple but efficient apparatus which accomplishes four very desirable results with regard to the sulfonation of an asphaltic material, namely, (1) removal of heat from the reaction zone, (2) dispersion of the highly reactive sulfonating agent so as to avoid local overtreating, (3) preventing settling of solid particles and (4) elimination of low fluid velocity areas where a gel might form.

Reasonable variation and modification are possible within the scope of the foregoing disclosure, the drawing and the appended claims to the invention, in which have been set out a method and apparatus for carrying out the sulfonation of asphaltic materials in a loop-type reactor provided with material circulating means, heat exchange means, and turbulence inducing baffle means at the inlet of the sulfonating agent.

I claim:
1. A process for sulfonating asphaltic material which comprises:
   moving said material into a continuous closed path reaction zone;
   passing said material through a first zone of restriction in said reaction zone;
   passing a sulfonating agent through said zone of restriction in the direction of flow of said material but out of contact with said material and discharging said agent into a zone of turbulence created by said first zone of restriction immediately downstream thereof and concomitantly creating in said material a zone of impingement of said agent, thus forming a reaction mixture of said material and said agent;
   passing said reaction mixture through a second zone of restriction immediately downstream of said zone of impingement;
   extracting heat from said reaction mixture in a heat exchange zone within said reaction zone;
   maintaining a continuous circulation of said reaction mixture in said reaction zone, thereby forming a sulfonated product; and
   continuously withdrawing from said reaction zone a portion of said reaction mixture containing said sulfonated product.

2. An apparatus for the sulfonation of asphaltic material, comprising:
   a pump;
   a conduit loop connecting the outlet of said pump with the inlet of said pump;
   combination turbulence inducing and sulfonating agent inlet means in said loop, said means comprising
     a first restrictive orifice in said loop,
     a baffle downstream of said orifice,
     a second restrictive orifice downstream of said baffle,
     a sulfonating agent inlet nozzle extending through said first orifice in the direction of flow therethrough and adapted to discharge said sulfonating agent into a zone of turbulence created by said first orifice downstream thereof and to impinge said sulfonating agent on said baffle;
   a cooler in said loop downstream of said combination means;
   means to feed asphaltic material and a solvent therefor into said loop upstream of said combination means;
   means to feed a sulfonating agent into said nozzle; and
   means to withdraw a sulfonated product from said loop, downstream of said combination means and said cooler.

References Cited in the file of this patent
UNITED STATES PATENTS

| | | |
|---|---|---|
| 923,571 | Paterson | June 1, 1909 |
| 1,496,345 | Lichtenthaeler | June 3, 1924 |
| 2,000,953 | Hooker et al. | May 14, 1935 |
| 2,299,469 | D'Antal | Oct. 20, 1942 |
| 2,332,527 | Pyzel | Oct. 26, 1943 |
| 2,538,235 | Coffey | Jan. 16, 1951 |
| 2,645,463 | Stearns | July 14, 1953 |
| 2,904,504 | Rice | Sept. 15, 1959 |
| 2,918,508 | Coopersmith et al. | Dec. 22, 1959 |

FOREIGN PATENTS

| | | |
|---|---|---|
| 1,071,259 | France | Mar. 3, 1954 |